(12) United States Patent
Wu

(10) Patent No.: US 7,860,501 B2
(45) Date of Patent: Dec. 28, 2010

(54) METHOD OF INFORMING A NETWORK OF CHANGE OF USER EQUIPMENT CAPABILITY

(75) Inventor: Yajuan Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 669 days.

(21) Appl. No.: 11/630,427

(22) PCT Filed: Jul. 7, 2005

(86) PCT No.: PCT/CN2005/000997

§ 371 (c)(1),
(2), (4) Date: Dec. 27, 2007

(87) PCT Pub. No.: WO2006/010312

PCT Pub. Date: Feb. 2, 2006

(65) Prior Publication Data

US 2008/0274739 A1    Nov. 6, 2008

(30) Foreign Application Priority Data

Jul. 30, 2004    (CN) .................... 2004 1 0070235

(51) Int. Cl.
*H04W 4/00* (2009.01)
(52) U.S. Cl. .................. 455/435.1; 455/432.1; 455/433
(58) Field of Classification Search ............. 455/435.1, 455/432.1, 432.3, 433, 445; 370/252, 352, 370/354, 328
See application file for complete search history.

(56) References Cited

U.S. PATENT DOCUMENTS 7,434,258 B2 * 10/2008 Bajko et al. .................... 726/21

7,624,266 B2 * 11/2009 Gabor .................... 713/168
2002/0037723 A1 * 3/2002 Roach .................... 455/435
2003/0229699 A1 * 12/2003 Moran et al. .................... 709/227

(Continued)

FOREIGN PATENT DOCUMENTS

CN    1263257 C    10/2003

(Continued)

OTHER PUBLICATIONS

"3GPP TS 24.228," Global System for Mobile Communications, V5.90, Jun. 2004.

*Primary Examiner*—George Eng
*Assistant Examiner*—Brandon J Miller
(74) *Attorney, Agent, or Firm*—Ladas & Parry, LLP

(57) ABSTRACT

A method of informing a network of a change of user equipment capability includes: stopping a registration timer on the user side set currently when the user equipment capability changes; sending a register request message carrying information of new user equipment capability to the network; analyzing, by the network, the register request message, and storing the information of new user equipment capability for reference by subsequent establishment of a session; stopping a current registration timer on the server side set for the user equipment; initiating a new registration timer on the server side for the user equipment; sending a response message carrying information of the new registration timer on the server side to the user equipment; resetting the registration timer on the user side based on information of the new registration timer on the server side in the response message. The capability change is informed to the network in time.

6 Claims, 1 Drawing Sheet

U.S. PATENT DOCUMENTS

| | | | |
|---|---|---|---|
| 2004/0076145 A1* | 4/2004 | Kauhanen et al. | 370/352 |
| 2004/0121775 A1* | 6/2004 | Ropolyi et al. | 455/445 |
| 2004/0122934 A1* | 6/2004 | Westman et al. | 709/223 |
| 2005/0041578 A1* | 2/2005 | Huotari et al. | 370/229 |

FOREIGN PATENT DOCUMENTS

| | | | |
|---|---|---|---|
| JP | 2002217945 A | | 8/2002 |
| KR | 2003-0039123 | | 5/2003 |
| WO | WO 98/26625 | * | 6/1998 |
| WO | 00/59255 | | 10/2000 |
| WO | 02/091785 A | | 11/2002 |
| WO | 03/103271 A | | 12/2003 |
| WO | 2006/010312 A1 | | 2/2006 |

\* cited by examiner

METHOD OF INFORMING A NETWORK OF CHANGE OF USER EQUIPMENT CAPABILITY

FIELD OF THE INVENTION

The present invention relates to a network using SIP protocol, including an IP multimedia subsystem (IMS) network, and more particularly, the present invention relates to a method of informing the network of a change of user equipment capability when the user equipment capability changes in the IMS network.

BACKGROUND OF THE INVENTION

With development of broadband network, mobile communications are not only limited to traditional voice communication. Multimedia service, which combines a plurality of media types, such as audio, video, photo and text, etc, will be developed gradually, and through combination with Presence (presence service), SMS (short message service), WEB browsing, location information, PUSH (push service), file sharing and other data services, it can satisfy various requests of users, e.g.:

message services: instant message and chat room, multimedia short message;

video services: entertainment, multimedia information, daily communication;

electronic commerce: product catalog, search engine, cart, order form management, payment;

game: single game, group game;

location service: searching for people, guiding, alarming;

personal assistant: address book, calendar, bookmark management, file storage, event reminder, E-mail.

Under promotion of various applications, 3GPP(3rd Generation Partnership Project), 3GPP2 (3rd Generation Partnership Project 2) and other standard organizations all successively launch an IMS(IP Multimedia Subsystem) architecture, with a purpose to implement various multimedia applications using a standard open structure in a mobile network and provide more choices and wonderful feelings.

In 3GPP Release 5 (R5) phase, an IMS is introduced, which is added to a packet domain network and includes such function entities as CSCF(Call Session Control Function), MGCF (Media Gateway Control Function), MRF (Mul timedia Resource Function) and HSS(Home Subscriber Server), etc. The CSCF can also be divided into three logic entities, which are S-CSCF(Service CSCF), P-CSCF(Proxy CSCF) and I-CSCF(Inquiry CSCF), wherein S-CSCF, as a service switching center of IMS, executes session control, maintains session state, manages user information, and generates charging information, etc; P-CSCF, as an access point for a terminal user to access the IMS, finishes subscriber register, and is responsible for QoS control and security management etc; I-CSCF is responsible for intercommunications between IMS domains, manages S-CSCF allocation, hides network topology structure and configuration from the outside, and generates charging data, etc. MGCF controls gateways and implements intercommunication between IMS network and other networks; MRF provides media resources, such as receiving/broadcasting voices, coding/decoding, establishing multimedia conference bridge; HSS is a user database, which stores subscription data and configuration information of IMS users, etc.

Because IMS network structure has no relation with a lower-layer bearer network, the IMS network defined by 3GPP can be applied to other packet networks besides the packet domain network defined by 3GPP, such as the packet network defined by 3GPP2, WLAN network, and NGN network, etc, independent of user terminal type and access network type. Therefore here IMS is not limited to be used in networks and applications related to 3GPP, but can be used in services and applications of other types of access networks and bearer networks.

Session Initiation Protocol (SIP): SIP is an IP phone signaling protocol proposed by IETF (Internet Engineering Task Force). As is implicated by its name, SIP is used to initiate a session, can control establishment and termination of a multimedia session joined by many participants, and can dynamically adjust and modify session attributes, such as session bandwidth request, transmitted media types (voice, video and text, etc), media coding/decoding formats, support for multicast and unicast, etc. In an IMS, SIP protocol is used as a signaling control protocol of an IP multimedia session.

A new framework of AAA—Diameter protocol:

AAA, i. e. Authentication, Authorization and Accounting, up to today, is always a foundation based upon which network carriers run and manage networks. With development of AAA, a new framework Diameter technology has come into being.

Diameter protocol suite includes a base protocol (Diameter Base Protocol) and various application protocols. The base protocol provides the lowest requirements of the AAA protocol for functions that must be achieved by all of Diameter network nodes, including negotiation of ability between the nodes, receiving and forwarding of Diameter messages and real time transmission of charging information, etc. The application protocols adequately utilize a message transmission mechanism provided by the base protocol and standardize functions and special message contents of corresponding nodes to implement AAA of application services.

In the IMS, Diameter protocol is used to transmit corresponding information on a Cx interface between HSS and I-CSCF and between HSS and S-CSCF.

Home Subscriber Server(HSS):

HSS, the most important database for each user, stores all information related to subscription and is used to support processes on a call or a session by each network entity, specifically including: user ID, number and addressing information, user security information, user location information and user profile information, etc. Home network can have one or several HSSs depending on the number of mobile subscribers, capacity of network devices and detailed networking situations. There are interfaces between HSS and several network entities, in which an interface between HSS and I-CSCF or between HSS and S-CSCF is a Cx interface.

In future multimedia applications, user equipments will be capable of supporting several media types, such as audio, video, text and image, etc, and each media type can support more than one coding/decoding format. Accordingly, user equipments may need to have various built-in or external devices. For a mobile phone, since its smaller size, Plug and Play devices are used more often, such as video camera, potable mobile store device, MP3, external keyboard, etc. Presence or absence of each of these devices means whether a terminal user can use a certain multimedia application, for example, the presence of video camera means that the user can initiate a video call. Even the device is not a Plug and Play device, it may need to be configured by users to be enabled or disabled, for example, a built-in recoding function, infrared function etc is enabled through special combination of keys on a keyboard.

Since these devices come into effect immediately once they are used, from the moment they take effect, the capability of the user equipment changes. A method of informing the network of the changed capability of the user equipment in time is needed, so that the network can know the capability of the user equipment immediately, and further determine whether to accept some service requests from the user equipment and whether to accept some service requests from other user equipments when the user equipment is called.

At present, in an IMS network, a negotiation on capability of a UE (user equipment) is implemented through a process of establishing and modifying an SIP session. When a UE (or mobile terminal) initiates to establish an SIP session, an INVITE message is used to bring the capabilities of a calling UE to the network and an opposite end UE. Each network node related to the session and the opposite end UE need to determine whether to accept the session establishment according to their respective support capabilities and support capability of the calling UE, for example, a P-CSCF (including a calling P-CSCF and a called P-CSCF) determines whether to allow establishment of the SIP session initiated by the calling UE or called UE according to a local strategy, and S-CSCF (including a calling S-CSCF and a called S-CSCF) determines whether to allow establishment of the SIP session initiated by the calling UE or called UE according to a local strategy or the subscriber profile downloaded from the HSS, while the called UE determines whether to accept the request of establishing the session according to its own capability. If the capability of the calling UE or called UE has changed before completion of the INVITE session, for example, a PnP device is plugged/unplugged or a built-in function is enabled/disabled etc, the related UE can modify the establishing SIP session by sending an UPDATE message bearing information of the changed capability of the UE and a network node and opposite end UE, after receiving the UPDATE message, will renegotiate the session establishment according to the changed capability of the UE and if the negotiation succeeds, the new capability of the UE is used to perform the session, or if the negotiation fails, the old capability of the UE is still used to establish the session. If the INVITE session has finished, an SIP session has been established successfully and a real service data transmission has been started between the calling UE and called UE or the calling UE and an AS (Application Server), and at this time the capability of the calling UE or called UE changes, for example, a PnP device is inserted or a certain built-in function is enabled to be used in the present service, a RE-INVITE message can be reinitiated, bearing information of the changed capability of the terminal, and the present session is renegotiated according to a re-negotiation process similar to the negotiation process of INVITE. After the re-negotiation succeeds, the new capability of the terminal is used to perform the service and the old negotiation result is deleted, or if the negotiation fails, the old negotiation result is still used to perform the service.

Besides the method of informing the network and opposite end UE of the user equipment capability during the session establishing and modifying process, when each UE establishes contact with the IMS network for the first time, that is, when it initiates an IMS register, the capability information of the user equipment can be encapsulated in a REGISTER message and sent to the network, and is stored in an S-CSCF for determining subsequent processes by the S-CSCF when the S-CSCF receives a request of establishing or modifying a SIP session subsequently.

SUMMARY OF THE INVENTION

The present invention provides a method of informing a network of a change of user equipment capability, A method of informing a change of user equipment capability includes: the user equipment stops a registration timer on the user side set currently when the user equipment capability changes; a register request message carrying information of new user equipment capability is sent to the network; the network analyzes the register request message and stores the information of the new user equipment capability for reference by subsequent establishment of a session; a current registration timer on the server side set for the user equipment is stopped; a new registration timer on the server side for the user equipment is initiated; a response message carrying information of the new registration timer on the server side is sent to the user equipment; and a registration timer on the user side is reset based on information of the new registration timer on the server side in the response message.

Compared to the prior art, the present invention may have the following advantages:

Through the use of the present invention, a re-register process can be initiated when the terminal capability changes by using an existing register flow and increasing the number of trigger points of the re-register process, and a network can be informed of the newest capability change of a user terminal, so that the network can utilize the new capability information of the user terminal to negotiate a session establishment process in a session process thereafter, which avoids additional messages for re-negotiating capabilities of both parties after a session begins, and therefore decreases the additional message intercommunication, shortens intercommunication time required by a session establishment, optimizes the implementing process, and lightens network loads.

BRIEF DESCRIPTIONS OF THE DRAWINGS

DETAILED DESCRIPTIONS OF THE INVENTION

User equipment capability is an attribute of a user equipment and is used to indicate possibility of the user equipment creating or processing a certain specific type of message content and can be negotiated during certain session processes. Some examples of basic capabilities are shown as follows: whether to support audio, video, message, automatic apparatus, mobility, specific SIP method (for example INVITE, CANCEL, etc), PRESENCE state and so on, types of supported languages (for example English, Chinese, etc) and basic categories of device (for example desktop, laptop or mobile phone, etc). When a certain capability value changes from zero to one, or from one to zero, the user equipment capability changes.

The embodiment of present invention provides a method, which is used to resolve the problem of how to inform corresponding nodes in a network if user equipment capability changes when a UE has registered with the network but not established a session yet. Through an immediate re-register process initiated by the UE, the network can be informed of the newest capability information of the UE in real time, and therefore it can use the newest capability information to negotiate an establishing session process during a subsequent session process, avoiding additional messages required to renegotiate the two parties capabilities after the session starts so that the additional intercommunication messages can be decreased, and the intercommunication time for establishing the session can be shortened. So the present invention may optimize the implementing process and lighten the network load.

Figure 1:
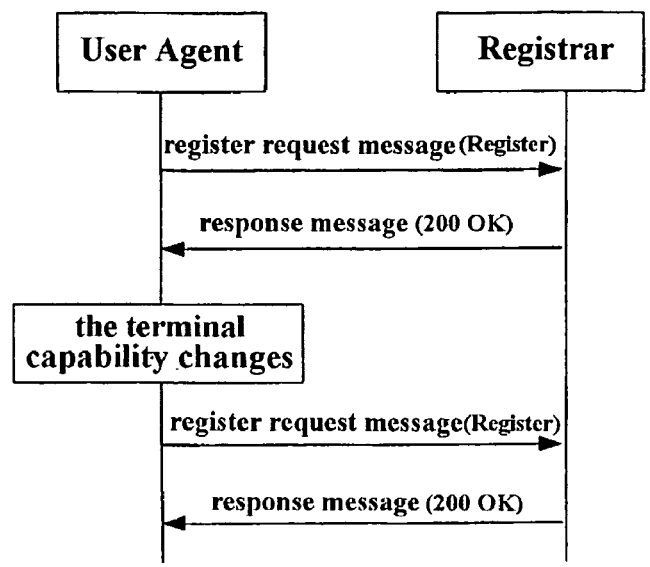
FIG. 1 is a flow chart of a method of informing a network of a user equipment capability change according to an embodiment of the present invention.

Please refer to FIG. 1, when a UE wants to get to contact with an IMS network or SIP network, a User Agent in the UE will initiate a register process, and send a register request message, such as a Register, to a function entity, such as a Registrar, responsible for register. The function entity usually locates in an S-CSCF of the IMS network;

The Registrar may perform operations such as an authentication on the User Agent. After the authentication is passed, a 200 OK message is returned to the User Agent, which carries a time length of a registration timer determined by the network or the shortest and longest refresh time allowed by the network;

The UE starts a registration timer on the user side according to the indication in the 200 OK message.

When the UE has registered with the network (certainly the UE has not yet registered with the network, but the UE can be configured to initiate a register request when the capability changes), but when no service is being processed and before the registration timer on the user side has expired, in case a PnP device is plugged into/unplugged from the UE or a built-in function is enabled/disabled(i.e., the user equipment capability changes), the User Agent of UE will be triggered automatically or manually to initiate a RE-REGISTER process, wherein information of a changed capability of the user equipment is carried in a register request message, so that information of the user equipment capability is stored/updated in a network node (for example, S-CSCF) responsible for processing the session. The detailed steps are shown as follows:

stopping a registration timer on the user side set currently when the user equipment capability changes;

sending a register request message by a user equipment carrying information of new user equipment capability to the network;

analyzing, by the network, the register request message, and storing the information of new user equipment capability for reference by subsequent establishment of a session stopping a current registration timer on the server side set for the user equipment;

initiating a new registration timer on the server side for the user equipment;

sending a response message carrying information of the new registration timer on the server side to the user equipment (in the embodiment, the response message may be a 200 OK message);

resetting the registration timer on the user side based on information of the new registration timer on the server side in the response message.

Wherein, before the UE initiates the re-register process, it stops the registration timer on the user side set during the previous register, and the register request message carries the new capability information of the UE; after the Registrar receives the register request message for register, if it finds that the registration timer on the server side set last time has not expired yet and the register request message carries the information related to the capability of the UE, it can be determined that this re-register is caused by the capability change of the UE.

If a network node responsible for processing the session and the Registrar locate in the same network entity, for example, S-CSCF in the IMS network, the server (for example, S-CSCF) directly stores the capability information of the terminal; if they locate in different network entities, the Registrar is responsible for forwarding the register request message to the server (for example, S-CSCF) responsible for processing the session to store; the server responsible for processing the session may utilize the new capability information of the UE during the session establishment process. The Registrar stops the registration timer on the server side, returns a response message, for example a 200OK message, which carries information of the new configured registration timer on the server side or the shortest and longest refresh time allowed by the network to the User Agent, and finishes the re-register process. After the UE receives the response message, it resets a registration timer on the user side.

Optionally, if a user has not registered with a network, through its own customization, the user may choose to trigger a new register process automatically when the capability of the UE changes or choose to trigger manually. The implementation is optional. Because a register initiation is commonly determined by a user, not by the UE, it can be set in the UE, and chosen by the user; either the user determines when the register is initiated, or the register is initiated automatically once each time the operation on the terminal device by the user results in the change of the UE capability, and in the latter case, the user knows the register, so it does not influence the usage. When the register request message carries the newest capability information of the UE, the information carried in the message may be a detailed capability value, including all capability information set by the current UE or the change value of the UE capability.

In addition, the user equipment can determine whether to inform the network according to the type of the plugged/unplugged device or the enabled/disabled function, and if the capability change of the UE of the category needs to be informed, it initiates a re-register or register. This function may be configured by users, or may be a UE's own capability.

In this way, the function of a re-register is: refreshing a current register; responding to the change of the UE's register state; adding a new function; informing the network about information of the changed user equipment capability.

Figure 2:
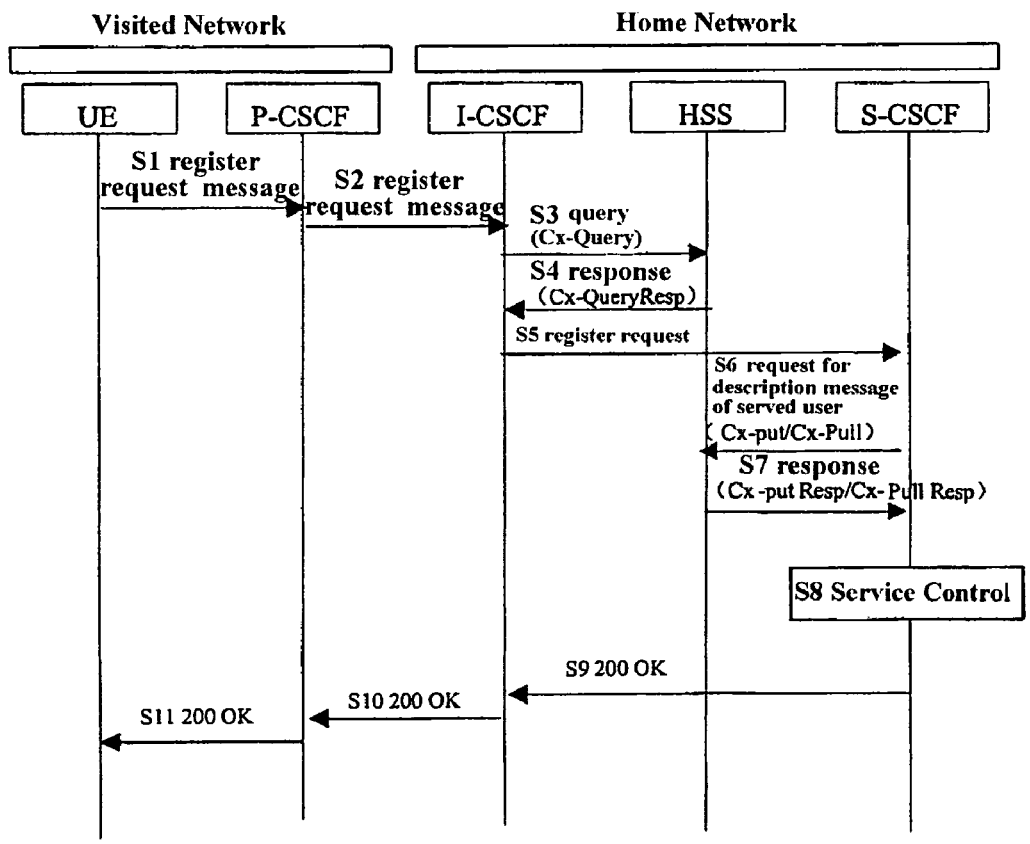
FIG. 2 is a detailed flow chart of the embodiment of FIG. 1.

When the present invention is applied to an IMS network, please refer to FIG.2, when the capability of the UE has changed, no matter whether the registration timer on the user side has expired or not, the UE initiates a re-register process, and stops the registration timer on the server side set by the previous register, and constructs a new register request message and sends it to a P-CSCF; after the P-CSCF receives the register request message, it does not need to store the new user equipment capability information since the P-CSCF may be a proxy CSCF locating in a visited network, but needs to check the validity of the register request message, and forwards it to the S-CSCF after authentication; the S-CSCF, as a control and service execution platform of the IMS session, needs to store the capability information of the UE, which is used as reference information for establishment of a subsequent session, then the S-CSCF stops the registration timer on the server side set during the previous register and starts a new registration timer on the server side or returns the shortest and longest refresh time required by the network, and returns a response message, for example a 200 OK message ,which carries the time length of the registration timer on the server side or the shortest and longest refresh time (uniformly called as the information of the registration timer) as acknowledgement to the P-CSCF, which is forwarded to the UE by the P-CSCF; the UE resets a new registration timer on the user side according to the received time after receiving the message.

The detailed implementation includes the following steps:

step S1: when the capability of the UE has changed, no matter whether the current registration timer has expired, the UE initiates a re-register and stops the registration timer on the server side set during the previous register, and constructs a new register request message and sends it to a P-CSCF, wherein the message includes public user ID, private user ID, domain name of a home network, IP address of the UE, and changed capability information of the UE.

step S2: the P-CSCF determines an access point to the home network through checking domain name of the home network, i.e., I-CSCF, obtains an address of the access point of the home network through parsing the domain name, and sends the register request message to the I-CSCF, wherein the main information carried includes: name or address of the P-CSCF, public user ID, private user ID, network ID where the P-CSCF locates, IP address of the UE, and changed capability information of the UE, etc.

step S3: the I-CSCF sends a Cx-Query(carried out on Cx interface, inquiring of an address of an S-CSCF serving the user from HSS) message to an HSS, in which the main information carried includes: public user ID, private user ID, network ID where the P-CSCF locates, etc.

step S4: the HSS finds that the user has registered, and returns an indication showing that a serving S-CSCF has been allocated for the user, and returns a Cx-Query Resp (a response message to the Cx-Query, which carries the address information of S-CSCF serving the user) message to the I-CSCF.

step S5: The I-CSCF, using the name of the S-CSCF, shall determine the address of the S-CSCF through a name-address resolution mechanism. The I-CSCF also determines the name of a suitable home network contact point, possibly based on information received from the HSS: when there is no need for network topology hidden function, it is just the S-CSCF; when there is a need for network topology hidden function, it is a I-CSCF having implemented the function. The P-CSCF forwards all the session signaling to the name of the home network contact point. The I-CSCF sends the register request message to the S-CSCF, wherein the main information carried includes: name or address of the P-CSCF, public user ID, private user ID, network ID where the P-CSCF locates, IP address of the UE, and changed capability information of the UE, and an address of the I-CSCF implementing the network topology hidden function if the function is needed.

step S6: the S-CSCF sends a Cx-Put message (or Cx-Pull message, the functions of the two messages are same in the specification, but the specification defining the two names, and the function of both of them is to request profile information of the served user from HSS by S-CSCF on Cx interface) to HSS, wherein the main information carried includes: public user ID, private user ID, name of S-CSCF, etc. Optionally, if the S-CSCF has already obtained the profile information of the corresponding user, this step may be omitted.

step S7: the HSS stores the name of the S-CSCF serving the user specified in the request message (the request message refers to Cx-Put), and inquires the subscriber information according to user ID, and returns a Cx-Put Resp (or Cx-Pull Resp) message (a corresponding response message, which is used to return the profile information of the specified user in the request message) as an acknowledgement, wherein the main information carried includes: user profile information, and security information, etc. Wherein the user profile information is used when the user accesses to various service control platforms.

step S8: the S-CSCF stores the capability information of the UE received from the register request message, and according to the capability information of the UE and considering a filter rule obtained from the user information, sends a register information to a corresponding service control platform to execute appropriate service control processes.

step S9: the S-CSCF returns a 200 OK message to the I-CSCF, wherein the main information carried includes: information of contact point of the home network, etc. If an I-CSCF with network topology hidden function is chosen in previous steps, the I-CSCF should encrypt the address of the S-CSCF in the information of contact point of the home network. Moreover, the S-CSCF should also re-specify the time length of the registration timer.

step S10: the I-CSCF forwards the 200 OK message to the P-CSCF, and releases all information related to the register;

step S11, the P-CSCF stores information of contact point of the home network, and forwards the 200 OK message to the UE. After the UE receives the message, according to the received time length of the registration timer on the server side, it re-sets the registration timer on the user side;

Subsequently, when the UE is as a called UE, the called S-CSCF can determine whether to accept a certain service request according to the stored newest capability information of the UE.

Based on the above, the embodiment of the present invention proposes a method of informing a network of a capability change of the user equipment. Through the use of the present invention, a re-register process can be initiated when the user equipment capability changes by using an existing register flow and increasing the number of trigger points of the re-register process, and therefore the newest capability change of the user equipment can be informed to S-CSCF node (s) in a network by the use of the flow, achieving the object of timely informing the network of a capability change. The S-CSCF in the network will store the capability information for a subsequent session establishment process, which avoids additional intercommunication messages when a service session begins a negotiation, shortens intercommunication time required by a session establishment, and is convenient to be carried out.

The forgoing description is only a preferred embodiment of the present invention instead of limiting the scope of the invention. It should be apparent to those skilled in the art that various changes, modifications and substitutions may be made without departing from the principle and spirit of the invention and therefore should be covered and protected by the scope of the invention as set by the appended claims and its equivalents.

I claim:

1. A method of informing a network of a change of user equipment capability, comprising:
   stopping a registration timer on the user side set currently by a user equipment when the user equipment capability changes;
   sending a register request message carrying information of new user equipment capability to the network;
   analyzing, by the network, the register request message, and storing the information of new user equipment capability for reference by subsequent establishment of a session;
   stopping a current registration timer on the server side set for the user equipment;
   initiating a new registration timer on the server side for the user equipment;
   sending a response message carrying information of the new registration timer on the server side to the user equipment;
   resetting the registration timer on the user side based on information of the new registration timer on the server side in the response message.

2. The method of informing a network of a change of user equipment capability according to claim 1, wherein said response message is a 200 OK message.

3. The method of informing a network of a change of user equipment capability according to claim 1, wherein said information of the new user equipment capability is stored in network nodes responsible for processing a session.

4. The method of informing a network of a change of user equipment capability according to claim 1, wherein said information of the registration timer on the server side means a new time length set by the network for resetting the registration timer on the user side or the shortest and longest refresh time allowed by the network.

5. The method of informing a network of user equipment capability according to claim 1, wherein if the register request message carries the information of user equipment capability and the current registration timer on the server side has not expired, the network determines that the register request message is one sent due to the user equipment capability change.

6. The method of informing a network of change of user equipment capability according to claim 1, wherein said method is triggered automatically when the user equipment monitors a change of the user equipment capability or triggered manually.

* * * * *